Patented Dec. 2, 1941

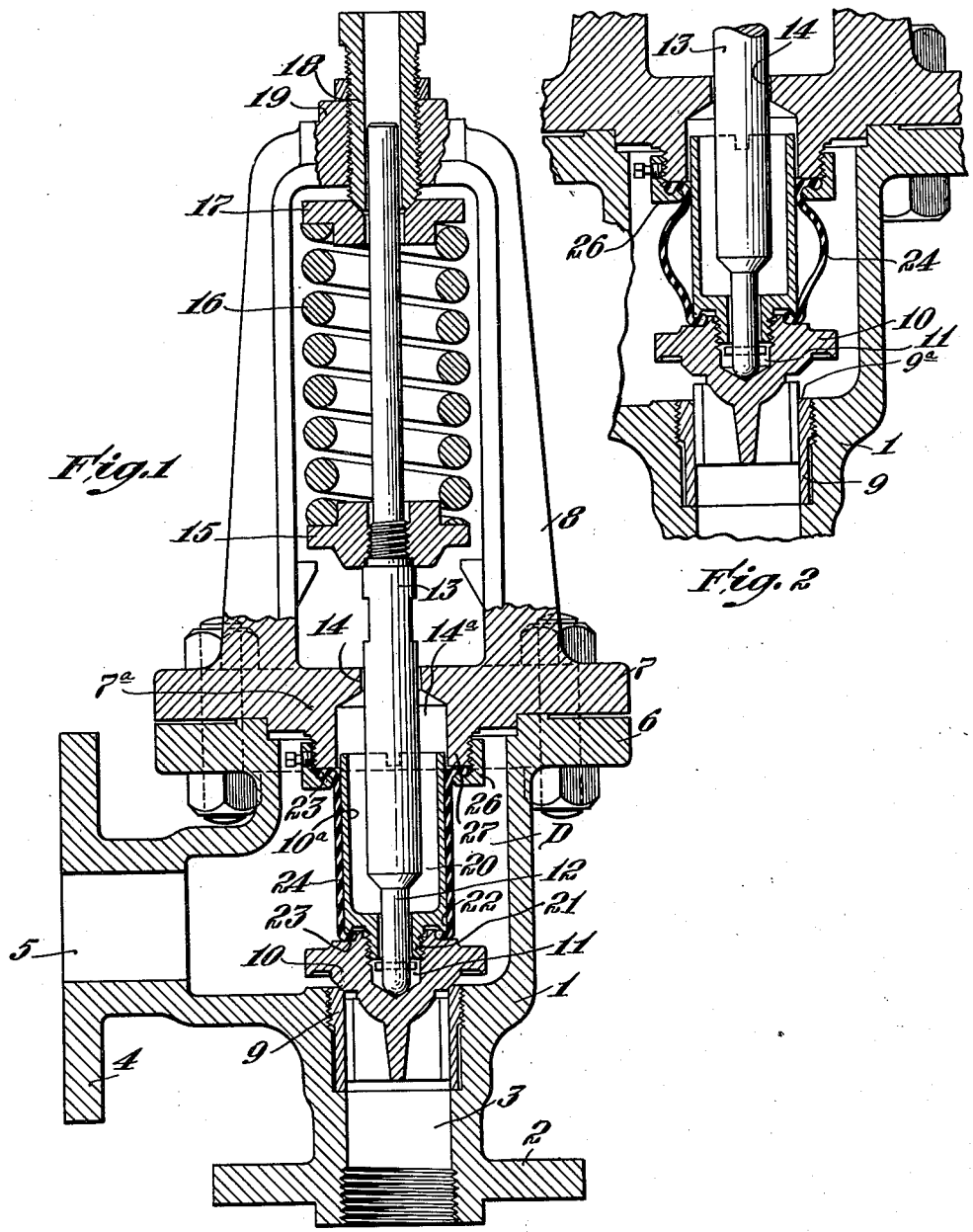

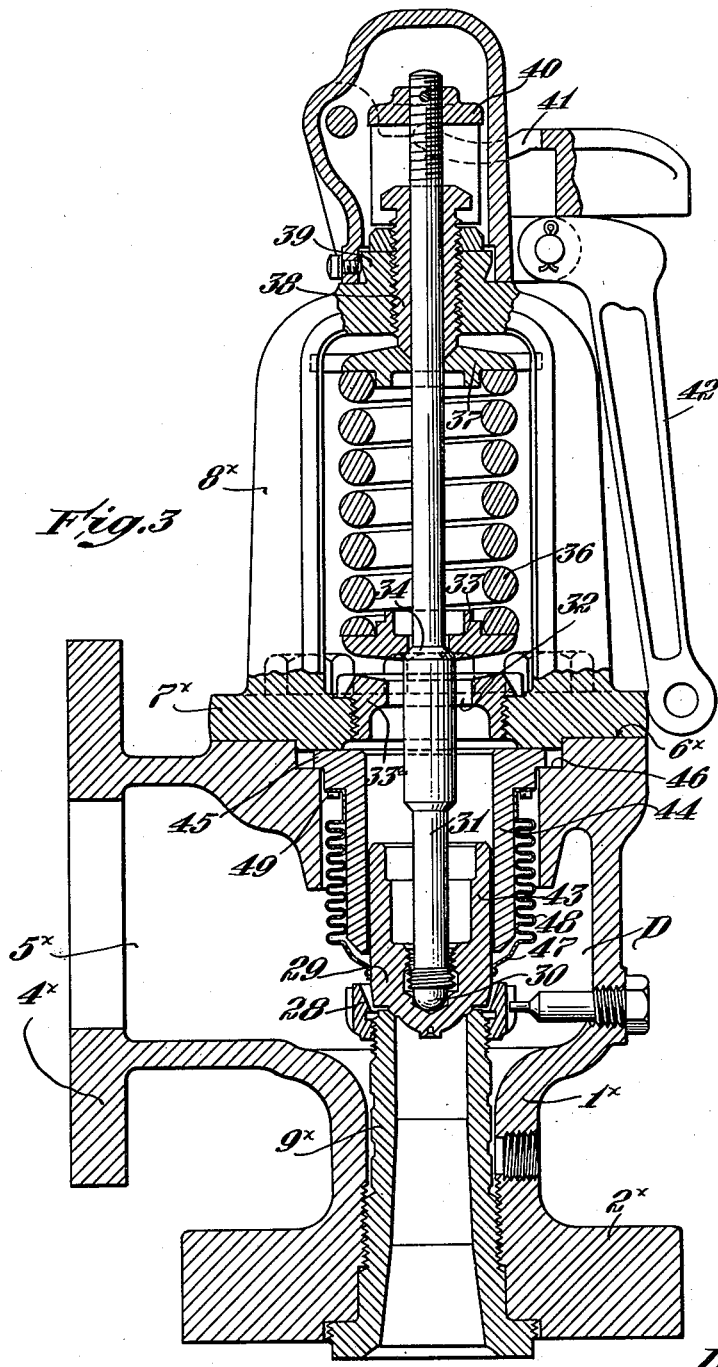

2,264,656

UNITED STATES PATENT OFFICE 2,264,656

SAFETY RELIEF VALVE

James Briscoe, Fairfield, and James L. Corcoran, Bridgeport, Conn., assignors to Manning, Maxwell & Moore, Incorporated, New York, N. Y., a corporation of New Jersey Application July 31, 1940, Serial No. 348,734

6 Claims. (Cl. 137—53)

This invention pertains to safety relief valves and relates more particularly to improvements designed to prevent the escaping pressure fluid, when the valve is open, from leaking into those portions of the valve structure, or into the surrounding space, where its presence is undesirable or injurious.

Such valves usually comprise as essential features a valve seat, a valve head or feather, and a spring which normally urges the valve head toward its seat. In addition, valves intended to be used with steam usually include a blowdown ring surrounding the valve seat.

When valves of this kind are opened the escaping high-pressure fluid tends to enter the narrow clearance space where the valve stem passes out through the wall of the casing and thus to leak out along the valve stem and into contact with the valve spring. Such leakage of pressure fluid is highly undesirable for many reasons. In some situations the uncontrolled escape of such fluid into the space wherein the valve is located, may be injurious or dangerous; contact of the fluid with the valve spring may cause corrosion of the spring, the stressed metal of the spring being peculiarly subject to corrosive action; if the escaping fluid be hot, it may so affect the temper of the spring as to change the popping point of the valve; and the escape of pressure fluid through the narrow clearance between the valve head and its guide (if the valve head be arranged to slide in a guide) may corrode the closely adjacent, relatively sliding surfaces, or may carry foreign material into the clearance space so as to retard or even prevent lift of the valve head from the seat.

Efforts have heretofore been made to prevent such leakage, but in most instances at least the proposed remedy has introduced other factors which in themselves have undesirable consequences. Thus, for example, it has been proposed to employ a packing gland to stop leakage along the valve stem, but the friction between the packing and stem tends to prevent the valve from opening at the exact desired popping pressure, and may also prevent full and free lift of the valve, with resultant chatter and vibration of the valve. An unduly low lift tends to cause the valve head to cock on one side, causing an unbalanced flow between the head and seat, which tends to initiate chatter. Once started, this condition tends to become more and more acute, since each sudden increase in pressure at the discharge side of the valve tends to force the valve back toward its seat, with a consequent drop in discharge pressure followed by another low lift, and so on, in recurring cycles. Not only is such vibration and chattering annoying by reason of the noise produced, but it seriously interferes with accurate opening of the valve, results in rapid wear of the parts, and may even result in complete destruction of the valve.

Instead of packing the valve stem to avoid leakage, it has been proposed to employ a closed bonnet which houses the spring and which has no outlet. However, the use of such a closed bonnet permits pressure to build up above the valve head, thus seriously interfering with the accuracy of opening of the valve, and tending to induce vibration and chatter. Moreover, to house the spring in an enclosure into which leakage may take place, but from which fluid cannot escape, accentuates any tendency to corrode or otherwise injure the spring, while the use of such an enclosure for the spring is forbidden by law in certain localities.

When valves of this type are so installed that a back pressure is imposed upon the valve head by reason of limited or delayed discharge capacity, the popping point of the valve may be varied very substantially, but prior valve constructions, so far as known to us, do not provide any adequate remedy for this undesirable condition.

Among the objects of the present invention are to provide a safety relief valve in which all leakage of pressure fluid outwardly along the valve stem or between the valve head and its guide (if a guide be employed) is prevented. A further object is to provide a leakless relief valve wherein the spring may be fully exposed and wherein no stem packing is employed, thus eliminating vibration and chatter such as may result from the use of an enclosed bonnet. A further object is to provide a leakless relief valve wherein entrance of pressure fluid into the clearance space between the head and guide (when a guide is provided) is wholly checked so that corrosion of the adjacent surfaces or the entrance of foreign substances between them is prevented, thus avoiding interference with the free and full lift of the valve from its seat. A further object is to provide a leakless relief valve wherein the spring is fully protected from corrosive or other injurious effects of contact with the pressure fluid. A further object is to provide a leakless relief valve so designed and arranged as not to be substantially affected by reason of varying back pressures in the delivery conduit.

A further object is to provide a safety relief valve wherein substantially all variables which might irregularly affect the popping point during use are substantially eliminated.

Other and further objects and advantages of the invention will be pointed out hereinafter in the following description and by reference to the accompanying drawings wherein:

Fig. 1 is a vertical section illustrating a safety relief valve embodying the present invention, showing the valve closed;

Fig. 2 is a fragmentary section on the same plane as Fig. 1, but showing the valve open; and Fig. 3 is a vertical section illustrating a safety relief valve such as is employed in steam engineering practice, also embodying the invention.

Referring to the drawings, the numeral 1 designates the body portion of the casing of the relief valve, said body having the integral attaching flange 2 disposed near the lower end of the inlet passage 3; the lateral flange 4 disposed near the end of the outlet passage 5 which leads from delivery chamber D, and the top flange 6 to which the flange 7 of the bonnet 8 is bolted.

The upper part of the inlet passage 3 is enlarged in diameter for the reception of the seat ring 9 which may be of wear-resistant material, if desired, such seat ring having the seat surface 9a (Fig. 2) at its upper end, with which cooperates a complemental surface at the under side of the valve head 10. The valve head is provided with a cavity 11 in its upper part for the reception of the lower end of the valve stem 12. The stem extends upwardly through the delivery chamber D of the valve body and comprises the cylindrical portion 13 which extends through an aperture 14 in the lower part 7a of the bonnet, the aperture 14 being of such diameter that there is a clearance space around the stem sufficient, under all conditions, to permit free up-and-down movement of the stem with reference to the bonnet. The portion 7a of the bonnet constitutes the top wall of the delivery chamber D. The stem 13 is provided with a collar 15, located within the bonnet, upon which rests the lower end of a loading spring 16 whose upper end bears against a collar 17 loose upon the stem and which may be forced downwardly by the adjusting sleeve 18 which has threaded engagement with a threaded bore in the upper part 19 of the bonnet.

The upper part of the cavity 11 in the valve head is screw threaded for the reception of a screw-threaded boss 21 integral with a hollow cylindrical support 10a which forms a hollow skirt for the valve, the upper part of the skirt being arranged within an enlargement 14a of the aperture 14 in the lower part 7a of the bonnet. The support or skirt 10a slides within the chamber 14a with sufficient clearance so that the valve head is free to move toward and from its seat without any substantial friction between the skirt 10a and the wall of the chamber 14a. By reason of the clearances between the parts 10a and 13 and the walls of the aperture 14 and the chamber 14a, respectively, in which these parts move, it would be possible, unless otherwise prevented, for pressure fluid to pass up around the skirt 10a into the chamber 14a and thence outwardly through the aperture 14 into the space surrounding the spring. Likewise atmospheric air is free to enter through the clearance space at 14 into the interior 20 of the hollow skirt or support 10a.

To prevent such leakage of pressure fluid from the chamber D upwardly into the bonnet, the present invention provides guard means extending from the valve head upwardly to the under side of the part 7a of the bonnet, such guard means completely housing that portion of the stem which extends from the valve head up to the aperture 14.

As here shown, the lower end of the support or skirt 10a is provided with a clamping rib 22 which engages the lower margin 23 of a cylindrical guard sleeve 24 and clamps such lower end leak-tight against the upper surface of the valve head 10. The upper margin of the guard sleeve 24 is clamped against the lower end of a hollow screw-threaded boss 27, extending downwardly from the bonnet, by means of a clamping collar 26.

The sleeve 24 is of impervious flexible material of a nature such, that as the valve head rises from its seat, the sleeve is free to flex as indicated in Fig. 2, but without imposing any substantial load upon the valve such as appreciably to interfere with the proper operation of the valve and its rise from the seat in response to a predetermined pressure. For use with ordinary liquids, for example water, the sleeve 24 may be made of rubber or rubberized fabric or, alternatively, of one of the flexible and resilient synthetic resins.

Returning to Fig. 3, the invention is shown as embodied in a valve, for example a safety valve, for use in steam engineering practice. This valve has a casing of more or less conventional type including the body portion 1× having the attaching flange 2× disposed adjacent to the lower end of the inlet passage 3×; the lateral flange 4× adjacent to the end of the delivery passage 5× leading from delivery chamber D; and the upper surface 6× designed for contact with the lower surface of the bottom portion 7× of the bonnet 8×. Within the inlet passage is secured the seat-supporting compensating bushing 9× which may, for example, be of the type disclosed in the patents to Graesser, No. 1,668,453, dated May 1, 1928, or Hopkins, No. 1,925,323, dated September 5, 1933, at whose upper end is formed the valve seat and which also supports the blow-down ring 28. The valve head 29 is designed to cooperate with said seat and is furnished with a cavity in its upper side for the reception of the lower end 30 of the valve stem 31. This valve stem extends out through a clearance aperture 32 in a ring 33 threaded into and forming a portion of that part 7× of the bonnet which forms the upper wall of the delivery chamber, the stem being provided with a shoulder 34 on which rests a collar 35 supporting the spring 36 whose upper end bears against a collar 37 loose on the valve stem. This collar is pressed down by an adjusting sleeve 38 having threaded engagement with a threaded bore in the upper part 39 of the bonnet. The stem extends through the sleeve 38 and is provided at its upper end with a fixed collar 40 designed to be raised by the operation of the valve-lifting elements 41 and 42, all in the usual manner.

The valve head 29 is provided with a hollow cylindrical skirt portion 43 which slides freely with some clearance in a cylindrical support and guide 44. This guide has a radial flange 45 at its upper end which is clamped against a shoulder 46 of the valve casing by the lower part 7× of the bonnet, the guide 44 being coaxial with the valve seat. Since there is clearance between the skirt 43 of the valve and the guide 44, it would be possible for pressure fluid, unless prevented, to pass from the chamber D through such clearance and through the aperture 32 upwardly into the bonnet and into contact with the valve spring. To prevent such leakage of pressure fluid, the valve is provided with a guard sleeve whose lower part 47 is secured leak-tight to the valve head in any suitable manner, for example by rivets or welding, such that pressure fluid cannot enter between this guard sleeve and the valve head. The guard sleeve as shown in Fig. 3 is a metallic bellows 48 whose body portion surrounds the guide 44 and whose upper margin is fixed at 49 to an exterior shoulder of the guide 44, for example by rivets or welding, in such a way that fluid cannot leak between the upper end of the bellows device and the guide 44 and thus enter the space between these parts. This bellows device 48 may be of spring brass, copper or the like, and is sufficiently flexible in an axial direction to permit free movement of the valve head toward and from its seat without imposing any substantial load upon the valve so that the valve is permitted to rise from its seat in response to the predetermined popping pressure.

While, as described with respect to the structure shown in Fig. 1 as well as that shown in Fig. 3, the pressure fluid is prevented from entering the space surrounding the valve stem between the point where the latter engages the valve head and the point where the stem emerges from the valve casing proper, nevertheless atmospheric air is permitted to enter this space through the clearance where the valve stem emerges from the casing. In the arrangement shown in Figs. 1 and 3, the external diameter of the skirt of the valve substantially equals the effective diameter of the valve seat and thus atmospheric pressure is always acting with a substantially constant load upon the upper side of the valve whether the valve is open or closed, so as at least partially to balance the pressure fluid acting upon the under side of the valve. This arrangement completely eliminates vibration or chatter of the valve since fluctuating back pressure in the delivery chamber has no effect on the valve disc.

In each case it will be noted that the axially collapsible guard member is internally supported by a rigid member. In Fig. 1, this is the movable skirt or sleeve 10ª, and in Fig. 3 it is the rigid guide 44. Thus, no matter how great the pressure in the delivery chamber D, the yieldable guard sleeve is supported against radial collapse, although always free to collapse in an axial direction.

In both arrangements disclosed it is evident that pressure fluid from chamber D cannot gain entrance to the upper side of the valve and that the pressure at the upper side of the valve is always substantially the same. This arrangement makes it much easier to set the valve to operate at an accurately predetermined point than would otherwise be the case; it substantially prevents chatter of the valve by reason of variable back pressure; it prevents the entrance of pressure fluid, of whatever kind, into the clearance space between the valve head and its guide or between the valve stem and the wall of the aperture where the stem leaves the valve casing, thus avoiding the deposit of solid materials in such clearance spaces or the corrosion of the walls of such clearance spaces such as might interfere with the free movement of the stem; and it also prevents leakage of pressure fluid, of whatever kind, into the bonnet where it might cause damage either to the valve spring or to the surroundings in which the valve is located.

While certain desirable embodiments of the invention have herein been illustrated by way of example, it is to be understood that the invention is not limited to these precise embodiments but is to be regarded as broadly inclusive of all modifications thereof such as fall within the terms of the appended claims.

We claim:

1. A relief valve comprising a casing having therein a delivery chamber, a valve seat, a valve head, a valve stem which extends outwardly through an aperture in a wall of said chamber, a spring exterior to said wall and which is constructed and arranged to urge the valve head toward the seat, and leak-preventing means including a substantially cylindrical sleeve coaxial with the valve stem, one end of the sleeve being secured leaktight to the valve head and its other end being secured leaktight to the wall of the chamber, said sleeve being a length of flexible impervious tubing capable of axial contraction in response to rise of the valve from its seat, a clamping ring securing the upper end of said sleeve, leakproof, to the wall of the chamber, an elongate, hollow, rigid cylindrical support disposed within the sleeve, said support having a threaded boss at its lower end engaging a threaded bore in the valve head, the lower end of the sleeve being clamped between the valve head and the lower end of said support, the support being operative to prevent inward collapse of the sleeve in response to external pressure.

2. A safety relief valve comprising a valve body having therein a delivery chamber, a valve bonnet having a part which forms one wall of said delivery chamber, the exterior of said wall being exposed to atmospheric pressure, a valve seat, a valve head, a valve stem which extends from the valve head through an aperture in said wall of the chamber into the bonnet, the stem passing through said aperture with clearance, a spring in the bonnet for loading the valve, the valve having an elongate hollow skirt portion whose outer diameter substantially equals that of the valve seat, the interior of said skirt always communicating with the atmosphere through the clearance about the valve stem, and a flexible element fixed to the valve head and operative to prevent escape of pressure fluid from the delivery chamber through the interior of said skirt and the clearance about the valve stem to the atmosphere.

3. A safety relief valve comprising a valve body having therein a delivery chamber, a valve bonnet having a part which forms one wall of said delivery chamber, said wall being freely exposed at its exterior to the atmosphere, a valve seat, a valve head, a valve stem which extends from the valve head through an aperture in said wall of the chamber into the bonnet, the stem passing through said aperture with clearance, a spring in the bonnet for loading the valve, the valve head being provided with an elongate hollow cylindrical skirt portion whose external diameter substantially equals that of the valve seat, the interior of the skirt always communicating by means of the clearance about the valve stem with the atmosphere, and a flexible sleeve surrounding said skirt portion, one end of the sleeve being secured to the valve head and movable therewith, the other end of the sleeve being fixed, and means operative to prevent leakage between said latter end of the sleeve and said wall of the chamber, said sleeve being operative to prevent pressure fluid from escaping from said delivery chamber through the interior of the sleeve and said clearance thereby protecting the spring from the effect of the escaping fluid.

4. A safety relief valve comprising a valve body having therein a delivery chamber, a valve bonnet having a part which forms one wall of said delivery chamber, the exterior of said wall being exposed to atmospheric pressure, a valve seat, a valve head, a valve stem which extends from the valve head through an aperture in said wall of the chamber into the bonnet, the stem passing through said aperture with clearance, a spring in the bonnet for loading the valve, the valve having an elongate hollow skirt portion whose outer diameter substantially equals the effective diameter of the valve seat, the interior of said skirt always communicating with the atmosphere through the clearance about the valve stem, and an axially contractible cylindrical sleeve of impervious material coaxial with said skirt portion, one end of said sleeve being secured leaktight to the valve head, the sleeve being constructed and arranged to prevent escape of pressure fluid from the delivery chamber through the interior of said skirt and through the clearance about the valve stem to the atmosphere.

5. A safety relief valve comprising a valve body having therein a delivery chamber, a valve bonnet having a part which forms one wall of said delivery chamber, the exterior of said wall being exposed to atmospheric pressure, a valve seat, a valve head, a valve stem which extends from the valve head through an aperture in said wall of the chamber into the bonnet, the stem passing through said aperture with clearance, a spring in the bonnet for loading the valve, the valve having an elongate hollow cylindrical skirt portion whose outer diameter substantially equals that of the valve seat, the interior of said skirt always communicating with the atmosphere through the clearance about the valve stem, and an axially contractible metallic bellows coaxial with said skirt portion, one end of the bellows being secured leak-tight to the valve head, the bellows being so constructed and arranged as to prevent escape of pressure fluid from the delivery chamber through the interior of said skirt and through the clearance about the valve stem to the atmosphere.

6. A safety relief valve comprising a valve body having therein a delivery chamber, a valve bonnet having a part which forms one wall of said delivery chamber, the exterior of said wall being exposed to atmospheric pressure, a valve seat, a valve head, a valve stem which extends from the valve head through an aperture in said wall of the chamber into the bonnet, the stem passing through said aperture with clearance, a spring in the bonnet for loading the valve, the valve having an elongate hollow skirt portion whose outer diameter substantially equals the effective diameter of the valve seat, the interior of said skirt always communicating, by means of the clearance about the valve stem, with the atmosphere, and an axially contractible metallic bellows coaxial with said skirt portion, one end of the bellows being secured leak-tight to the valve head and being movable with the latter, the other end of the bellows being secured leak-tight to a fixed part of the wall of the delivery chamber, said bellows being operative to prevent pressure fluid from escaping from the delivery chamber through the interior of the sleeve and through said clearance, thereby to protect the spring from the effect of the escaping fluid.

JAMES BRISCOE.
JAMES L. CORCORAN.